United States Patent
Ogawa et al.

(10) Patent No.: US 11,153,552 B2
(45) Date of Patent: Oct. 19, 2021

(54) IMAGE PROCESSING APPARATUS, IMAGE PROCESSING METHOD AND NON-TRANSITORY COMPUTER-READABLE STORAGE MEDIUM

(71) Applicant: CANON KABUSHIKI KAISHA, Tokyo (JP)

(72) Inventors: Shuhei Ogawa, Kawasaki (JP); Shinichi Miyazaki, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 11 days.

(21) Appl. No.: 16/443,186

(22) Filed: Jun. 17, 2019

(65) Prior Publication Data
US 2020/0007854 A1 Jan. 2, 2020

(30) Foreign Application Priority Data
Jun. 29, 2018 (JP) .............................. JP2018-125281

(51) Int. Cl.
*H04N 7/18* (2006.01)
*H04N 13/271* (2018.01)
(Continued)

(52) U.S. Cl.
CPC ........... *H04N 13/271* (2018.05); *G06T 5/003* (2013.01); *G06T 7/50* (2017.01); *H04N 5/23212* (2013.01);
(Continued)

(58) Field of Classification Search
CPC .................................................. H04N 13/271
See application file for complete search history.

(56) References Cited

U.S. PATENT DOCUMENTS 9,106,140 B2   8/2015   Sato
9,324,153 B2   4/2016   Komatsu
(Continued)

FOREIGN PATENT DOCUMENTS

EP   2538242 A1   12/2012
EP   2538242 B1   7/2014
(Continued)

OTHER PUBLICATIONS

Radhakrishna Achanta, et al., "SLCI Superpixels Compared to State-of-the-Art Superpixel Methods," IEEE Transactions on Pattern Analysis and Machine Intelligence, vol. 34, No. 11 (Nov. 2012), pp. 2274-2281.

(Continued)

*Primary Examiner* — Fabio S Lima
(74) *Attorney, Agent, or Firm* — Venable LLP

(57) ABSTRACT

An image processing apparatus, comprises: an obtainment unit that obtains a captured image including a plurality of pixels, and distance information relating to a distance from an in-focus plane and corresponding to each of the plurality of pixels; a deriving unit that derives an evaluation value that indicates an accuracy of the distance information and is based on values of the plurality of pixels; and a generation unit that newly generates, based on the distance information and the evaluation value, distance information for each of the plurality of pixels, wherein the generation unit generates distance information corresponding to an area of interest including at least one pixel, based on distance information of a surrounding area of the area of interest.

11 Claims, 10 Drawing Sheets

(51) Int. Cl.
  *H04N 5/232* (2006.01)
  *H04N 13/128* (2018.01)
  *G06T 7/50* (2017.01)
  *H04N 13/122* (2018.01)
  *G06T 5/00* (2006.01)

(52) U.S. Cl.
  CPC ....... *H04N 5/23229* (2013.01); *H04N 13/122* (2018.05); *H04N 13/128* (2018.05)

(56) References Cited

U.S. PATENT DOCUMENTS

| | | | |
|---|---|---|---|
| 9,406,139 B2 | 8/2016 | Shionozaki et al. | |
| 9,426,444 B2 | 8/2016 | Guigues et al. | |
| 9,799,118 B2 * | 10/2017 | Komatsu | G06T 7/536 |
| 2013/0142452 A1 | 6/2013 | Shionozaki et al. | |
| 2013/0300860 A1 | 11/2013 | Komatsu | |
| 2014/0160803 A1 | 6/2014 | Sato | |
| 2014/0253679 A1 | 9/2014 | Guigues et al. | |
| 2015/0139534 A1 * | 5/2015 | Komatsu | G06T 7/536 382/154 |
| 2015/0201121 A1 * | 7/2015 | Nobayashi | H04N 9/04557 348/222.1 |
| 2016/0307361 A1 | 10/2016 | Shionozaki et al. | |
| 2017/0127048 A1 * | 5/2017 | Nobayashi | H04N 13/128 |
| 2019/0253609 A1 | 8/2019 | Miyazaki et al. | |
| 2019/0253689 A1 | 8/2019 | Yanai et al. | |
| 2019/0253690 A1 | 8/2019 | Yanai et al. | |

FOREIGN PATENT DOCUMENTS

| | | |
|---|---|---|
| JP | 2008-015754 A | 1/2008 |
| JP | 2013-118468 A | 6/2013 |
| JP | 2013-253964 A | 12/2013 |
| JP | 2014-017907 A | 1/2014 |
| JP | 2015-162730 A | 9/2015 |
| JP | 6143747 B2 | 6/2017 |
| JP | 2017-157208 A | 9/2017 |

OTHER PUBLICATIONS

Dongbo Min, et al., "Fast Global Image Smoothing Based on Weighted Least Squares," IEEE Transaction on Image Processing, vol. 23, Issue 12 (2014), pp. 5638-5653.

Johannes Kopf, et al., "Joint Bilateral Upsampling," ACM Transactions on Graphics, vol. 26, No. 3, Article No. 96 (Jul. 2007).

* cited by examiner

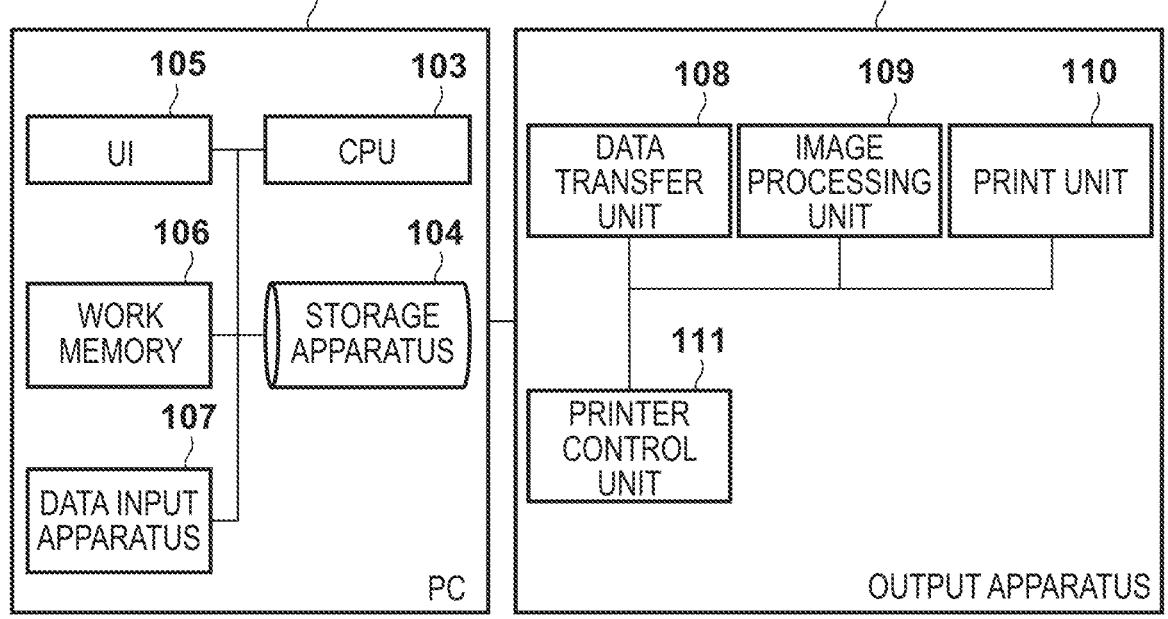
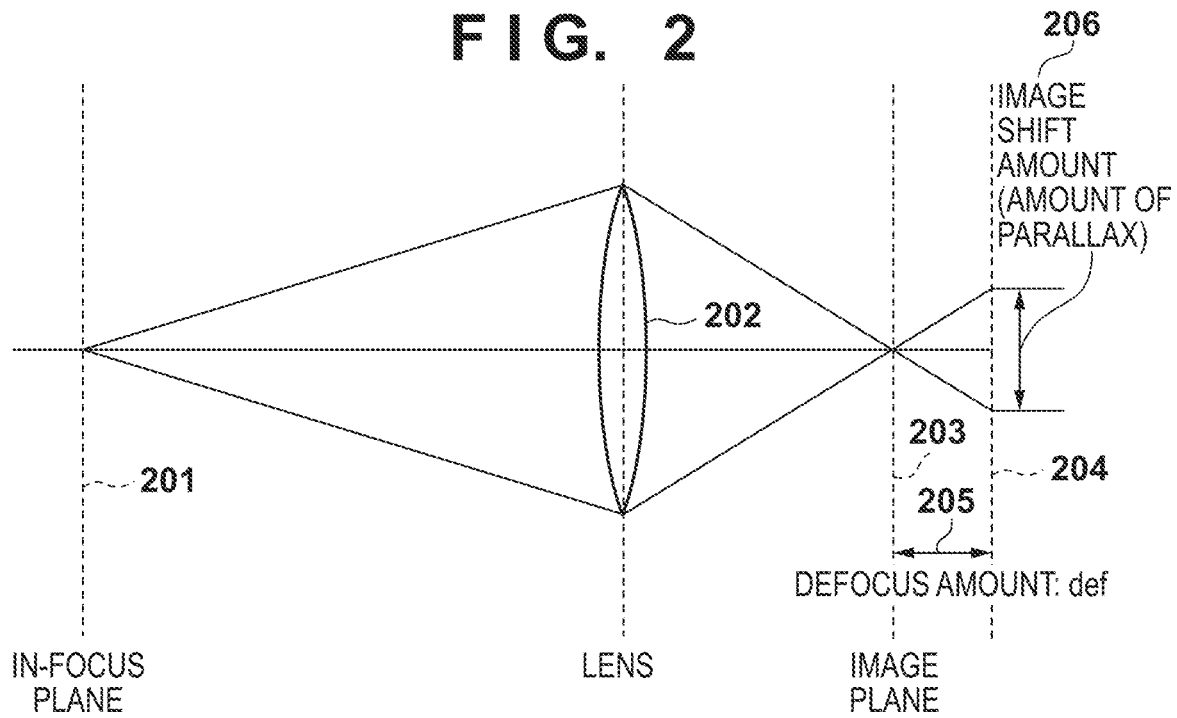

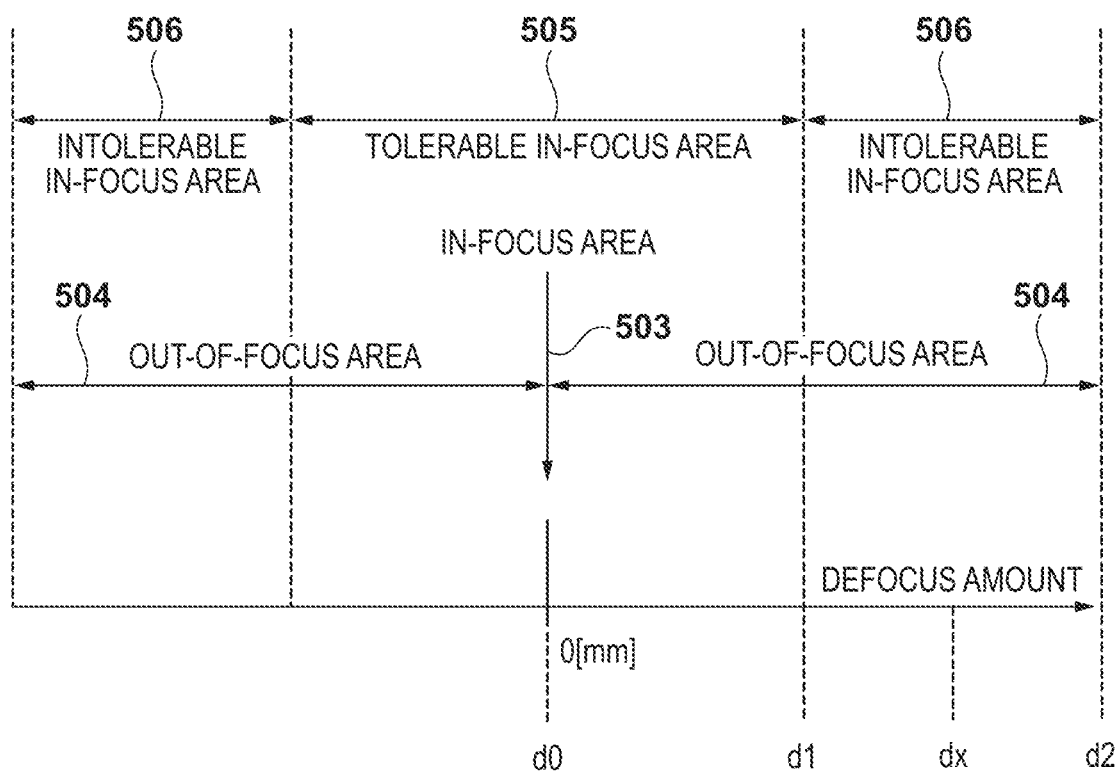

THREE-DIMENSIONAL
APPEARANCE CONTROL
AMOUNT

THREE-DIMENSIONAL
APPEARANCE CONTROL
AMOUNT

THREE-DIMENSIONAL
APPEARANCE CONTROL
AMOUNT

THREE-DIMENSIONAL
APPEARANCE CONTROL
AMOUNT

IMAGE PROCESSING APPARATUS, IMAGE PROCESSING METHOD AND NON-TRANSITORY COMPUTER-READABLE STORAGE MEDIUM

BACKGROUND OF THE INVENTION

Field of the Invention

The present invention relates to an image processing apparatus, an image processing method, and a non-transitory computer-readable storage medium.

Description of the Related Art

Humans perceive something seen by the eyes as three-dimensional. This is thought to be the brain perceiving based on clues from both eyes, clues from a single eye, motion parallax, or the like. Clues from both eyes include, for example, retinal parallax which is a difference between retinal images for both eyes. Furthermore, a clue from a single eye may be a line perspective, the size of an object, a texture gradient, atmosphere distance, a defocused state effect, or the like. By using at least one of these clues, a human perceives a three-dimensional appearance, in other words, the depth or thickness of an "object", and an in front/behind relationship for the "object".

When a person views a displayed, projected or printed two-dimensional image that was captured by an image capturing apparatus, a three-dimensional appearance of the image is recognized from a difference between a portion in focus, and a portion that is in a defocused state in accordance with depth. In other words, reproduction of the portion of the image that is in focus and the portion that is not in focus (is in a defocused state) is important for a three-dimensional appearance.

However, defects and noise are included in information (a depth value, a defocus amount, or the like) that corresponds to distance from an in-focus plane and is obtained from, for example, parallax information of the image capturing apparatus. For example, in a stereo method of measuring a depth value from the parallax information of two image capturing apparatuses, the accuracy of depth that can be obtained depends on the distance between the two image capturing apparatuses. In such a case, the smaller the distance between the image capturing apparatuses, the worse the accuracy of the depth becomes. Accordingly, in a situation where it is not physically possible to have the distance between two image capturing apparatuses be sufficiently large, it is difficult to guarantee the accuracy of depth or defocus to a level that is necessary for control of a three-dimensional appearance. In addition, the accuracy of a depth value or a defocus amount also depends on a captured image. In particular, in a case where capturing is performed by the stereo method described above, edge portions of an image have high contrast, and depth values are likely to be uniquely determined. In contrast, because a level portion of the image has low contrast and depth values tend not to be uniquely determined, reliability (accuracy) of the depth values is low.

As a technique for improving the accuracy of depth obtained from a camera, for example, Japanese Patent No. 6143747 identifies a pixel having noise in a depth value by obtaining a directional derivative of the depth value, from a depth value of a pixel of interest and depth values of surrounding pixels. However, Japanese Patent No. 6143747 uses only depth values to identify a pixel that has noise, and thus has a problem of being easily influenced by depth values having low reliability (accuracy) in, for example, the aforementioned flat portion of an image described above.

SUMMARY OF THE INVENTION

In view of the problem described above, the present invention improves the accuracy of information that corresponds to a distance from an in-focus plane and relates to a captured image.

According to one aspect of the present invention, there is provided an image processing apparatus, comprising: an obtainment unit configured to obtain a captured image including a plurality of pixels, and distance information relating to a distance from an in-focus plane and corresponding to each of the plurality of pixels; a deriving unit configured to derive an evaluation value that indicates an accuracy of the distance information and is based on values of the plurality of pixels; and a generation unit configured to, based on the distance information and the evaluation value, newly generate distance information for each of the plurality of pixels, wherein the generation unit generates distance information corresponding to an area of interest including at least one pixel, based on distance information of a surrounding area of the area of interest.

According to another aspect of the present invention, there is provided an image processing method, comprising: obtaining a captured image including a plurality of pixels, and distance information relating to a distance from an in-focus plane and corresponding to each of the plurality of pixels; deriving an evaluation value that indicates an accuracy of the distance information and is based on values of the plurality of pixels; and based on the distance information and the evaluation value, newly generating distance information for each of the plurality of pixels, wherein in the generating, distance information corresponding to an area of interest including at least one pixel is newly generated based on distance information of a surrounding area of the area of interest.

According to another aspect of the present invention, there is provided a non-transitory computer-readable storage medium storing a program for causing a computer to function as: an obtainment unit configured to obtain a captured image including a plurality of pixels, and distance information relating to a distance from an in-focus plane and corresponding to each of the plurality of pixels; a deriving unit configured to derive an evaluation value that indicates an accuracy of the distance information and is based on values of the plurality of pixels; and a generation unit configured to, based on the distance information and the evaluation value, newly generate distance information for each of the plurality of pixels, wherein the generation unit generates distance information corresponding to an area of interest including at least one pixel, based on distance information of a surrounding area of the area of interest.

By virtue of the present invention, it is possible to improve the accuracy of information that corresponds to a distance from an in-focus plane and relates to a captured image.

Further features of the present invention will become apparent from the following description of exemplary embodiments (with reference to the attached drawings).

BRIEF DESCRIPTION OF THE DRAWINGS

FIG. 1 is a view illustrating an example of a configuration of an output apparatus and a PC according to the present invention.

FIG. 2 is a view illustrating a relation between a lens, an image shift amount, a defocus amount, and an in-focus plane.

FIG. 6 is a view for describing a defocus amount and each area.

DESCRIPTION OF THE EMBODIMENTS

Figure 3:
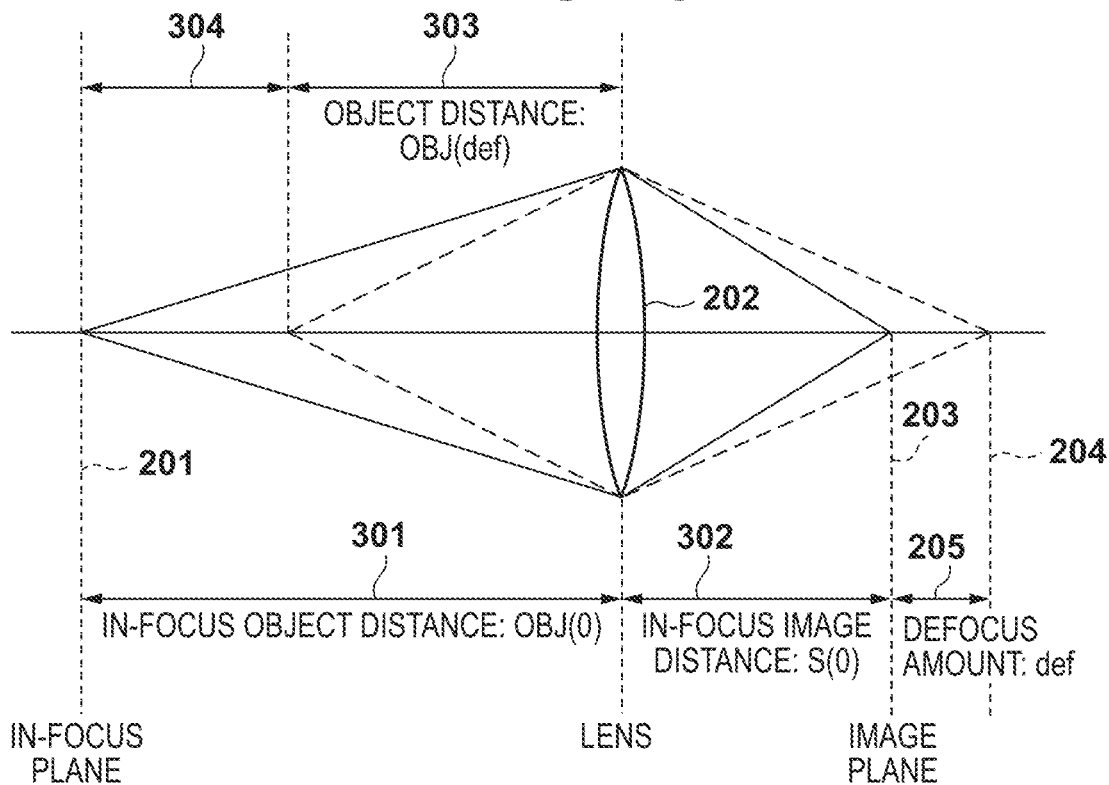
FIG. 3 is a view illustrating a relation between an in-focus image distance, an object distance, and an in-focus object distance.

With reference to the drawings, description is given for an image processing apparatus according to embodiments of the present invention. The same reference numerals denote the same members that perform the same operation in each drawing, and redundant descriptions will be omitted. In addition, components presented in the embodiments described below are at most examples, and are not intended to limit the scope of the invention thereto.

In each embodiment described below, taking an ink-jet printer as an example of an output apparatus, description is given for image processing for performing three-dimensional appearance control based on a corrected defocus amount (defocus information). In addition, in the following description, control for reproduction of the three-dimensional appearance when forming a two-dimensional image is recited as three-dimensional appearance control.

[System Configuration]

FIG. 1 illustrates an example of an overall configuration of a print system that applies an image processing apparatus according to an embodiment of the present invention. It is configured by including an information processing apparatus (hereinafter referred to as a "PC") 101 and an output apparatus 102. The PC 101 and the output apparatus 102 are communicably connected by an interface such as a network, USB (Universal Serial Bus), or a local bus. A connection method is not particularly limited, and may be wired or wireless. With respect to the output apparatus 102, the PC 101 performs a print control instruction, transfer of necessary information and data, and the like. Accordingly, although not illustrated in FIG. 1, the PC 101 and the output apparatus 102 are each provided with an external apparatus and a communication unit.

The PC 101 is configured by including a CPU 103, a storage apparatus 104, a UI 105, a work memory 106, and a data input apparatus 107. The storage apparatus 104 is a non-volatile storage area, and stores an OS (Operating System), a system program for the present embodiment, various application software, and parameter data necessary for various processing. The storage apparatus 104 can be configured by means typified by an HDD or a flash ROM. The CPU 103 executes processing that uses the work memory 106 when executing various software stored in the storage apparatus 104. The UI 105 is an operation unit that is a user interface, and includes a display device such as a display and an input device such as a keyboard and a mouse, in relation to the execution of various processing. The work memory 106 is a volatile storage area, and is used when the CPU 103 executes various processing, for example. The data input apparatus 107 inputs and outputs data with respect to an external storage medium such as an SD card. In addition, configuration may be taken so that an image capturing apparatus (not shown) such as a camera is connected to the data input apparatus 107, and the PC 101 directly transfers data without going through an external storage medium.

The output apparatus 102 is configured by including a data transfer unit 108, an image processing unit 109, a printing unit 110, and a printer control unit 111. As described above, in the present embodiment, description is given by assuming that the output apparatus 102 is a printer that can execute a print operation by an inkjet method, but the output apparatus 102 may be, for example, a Multi-Function Peripheral (MFP) having other functions. Print data used in print processing is transmitted to the output apparatus 102 from the PC 101 as appropriate. Print data in the present embodiment is configured by including the following data. Note that the data indicated here is an example, and other data may be included.

(1) Input image data captured by an image capturing apparatus such as a camera.

(2) Information that corresponds to a distance from an in-focus plane at a time of capturing corresponding to the input image data.

(3) Image processing parameter and printer control data.

(4) Print information data such as a print medium or a print quality selected on a UI by a user.

The print medium is a medium to which image forming is performed in the output apparatus 102, and, for example, indicates a paper medium or the like. The information corresponding to the distance from the in-focus plane at a time of capturing (hereinafter also referred to as "distance information") corresponds to a defocus amount, an image shift amount, information of an actual distance from the in-focus plane to an object, and the like. The input image data and the distance information may be generated inside the image capturing apparatus (not shown), and may be generated in the PC 101 or the output apparatus 102 which is connected to the image capturing apparatus (not shown). In addition, configuration may be taken such that information for generating the distance information is obtained from the image capturing apparatus (not shown), and the distance information is generated inside the output apparatus 102 or the PC 101 which is connected to the image capturing apparatus. Here, the information for generating the distance information may be a pair of images obtained by respective photoelectric conversion of light that passed through different areas of an exit pupil of an image capturing lens provided in the image capturing apparatus, for example.

From print data sent from the PC 101, the data transfer unit 108 extracts, input image data, distance information, and the image processing parameter and sends them to the image processing unit 109. The data transfer unit 108 also sends printer control data and print information data to the printer control unit 111.

The image processing parameter and the printer control data are stored in the storage apparatus 104 inside the PC 101 or a storage apparatus (an HDD, a ROM, or the like; not illustrated) inside the output apparatus 102. Configuration may be taken so that these are selected based on print information data inside print data, and sent to the image processing unit 109 or the printer control unit 111. The printer control unit 111 controls an operation of the printing unit 110 in accordance with printer control data. In the present example, in relation to printing in the printing unit 110, printing is performed by an inkjet printing method.

FIG. 2 is a view for describing a relationship between a defocus amount, an image shift amount, and an in-focus plane at a time of capturing, according to the present embodiment. In FIG. 2, an in-focus plane 201 is a focal plane in parallel with an image plane (an image capturing plane) 203 in the image capturing apparatus (not shown). In addition, a defocus amount 205 (def) is a difference between the image plane 203 and a defocused image capturing plane position 204 (a difference between a planned image forming plane and an actual image forming plane), and is proportional to an amount of bokeh. In the present example, the planned image forming plane corresponds to the image plane 203, and the actual image forming plane corresponds to the image capturing plane position 204. As a method of detecting the defocus amount 205, conventionally, a pupil-dividing phase difference detection method and a method for detecting a defocus amount using a plurality of images in different defocused states are known.

For example, Japanese Patent Laid-Open No. 2008-15754 discloses a method for calculating the defocus amount 205 from an image shift amount (an amount of parallax) 206 of the image illustrated in FIG. 2. In this method, correlation values are calculated while shifting data relatively for a pair of pieces of pixel data obtained by respectively photoelectrically converting light that passed through different areas of an exit pupil of an image capturing lens, and making the image shift amount 206 at which the correlation is the highest be the amount of parallax. Further, the defocus amount 205 with respect to the planned image forming plane of an object image plane is calculated with respect to the calculated image shift amount 206 using a conversion coefficient determined in accordance with the pixel pitch of an image sensor device and a lens.

In addition, Japanese Patent Laid-Open No. 2013-253964 has disclosed a method of calculating a defocus amount by the Depth From Defocus (DFD) method. In the DFD method, a plurality of images in different defocused states are obtained by controlling capturing parameters of an image capturing optical system, and a measurement target pixel and peripheral pixels thereof are used to calculated an amount of correlation of defocused states therebetween among the plurality of obtained images, to thereby calculate the defocus amount 205.

Next, using FIG. 3, description is given for a method of calculating a distance between the in-focus plane 201 and an object. In FIG. 3, reference numeral 301 indicates an in-focus object distance OBJ(0), and is a distance between the lens 202 and the in-focus plane 201. Reference numeral 302 indicates an image plane distance S(0) to a focus image object, and is the distance between the lens 202 and the image plane 203 (a planned image forming plane). Reference numeral 303 indicates an object distance OBJ(def), and is a distance between the object (not shown) and the lens 202. Reference numeral 304 is a distance between the in-focus plane 201 and the object (not shown). A variable def indicates the defocus amount 205. In addition, a case where the variable def=0 indicates that a difference between the image plane 203 and the defocused image capturing plane position 204 is 0. By lens formulas, Equation (1) and Equation (2) below are established, and thus the object distance OBJ(def) can be calculated by Equation (3) below.

$$\frac{1}{OBJ(0)} + \frac{1}{S(0)} = \frac{1}{f} \tag{1}$$

$$\frac{1}{OBJ(def)} + \frac{1}{S(0) + def} = \frac{1}{f} \tag{2}$$

$$OBJ(def) = \frac{\{S(0) + def\} \cdot f}{\{S(0) - def\} \cdot f} \tag{3}$$

The distance 304 from the in-focus plane 201 to the object (not shown) can be calculated by subtracting the object distance OBJ(def) calculated by equation (3) from the in-focus object distance OBJ(0).

The above-mentioned information (distance information) corresponding to the distance from the in-focus plane 201 is information proportional to a distance from the in-focus plane 201. The information (distance information) corresponding to the distance from the in-focus plane 201 can be any of the above-described image shift amount 206, defocus amount 205, and distance 304 from the in-focus plane 201 to the object (not shown).

Next, a defocus map will be explained. A result of mapping the defocus amount 205 described above onto a plurality of locations on the input image data is a defocus map that holds information of a defocus amount corresponding to each pixel of the input image data. Accordingly, the number of pieces of information of the defocus amount held differs in accordance with a number of pixels of the input image data.

FIG. 6 is a view for describing the defocus amount and each area used in the present embodiment. In FIG. 6, abscissa indicates a defocus amount [mm], with a center value set to 0, and the defocus amount increasing the more there is separation left or right. In FIG. 6, the defocus amount being "0" is a defocus amount corresponding to the in-focus plane 201 for a time of capturing, and is referred to as an in-focus plane image area (hereinafter, an in-focus area 503). In the present embodiment, an area apart from the in-focus area 503 is set as an out-of-focus area 504 as an area that does not correspond to the in-focus plane 201 on the defocus map. In addition, a tolerable area where there is focus is set as a tolerable in-focus area 505. The tolerable in-focus area 505 may define the range of a depth of field, and may be defined arbitrarily by subject experiment. An area other than the tolerable in-focus area 505 is set as the intolerable in-focus area 506 in the present embodiment. In FIG. 6, abscissa is set as the defocus amount, but there is no limitation to this. For example, other information may be used as the distance information, such as the information of the above-described image shift amount 206, the distance 304 from the in-focus plane 201 to the object, or the like.

First Embodiment

Figure 4:
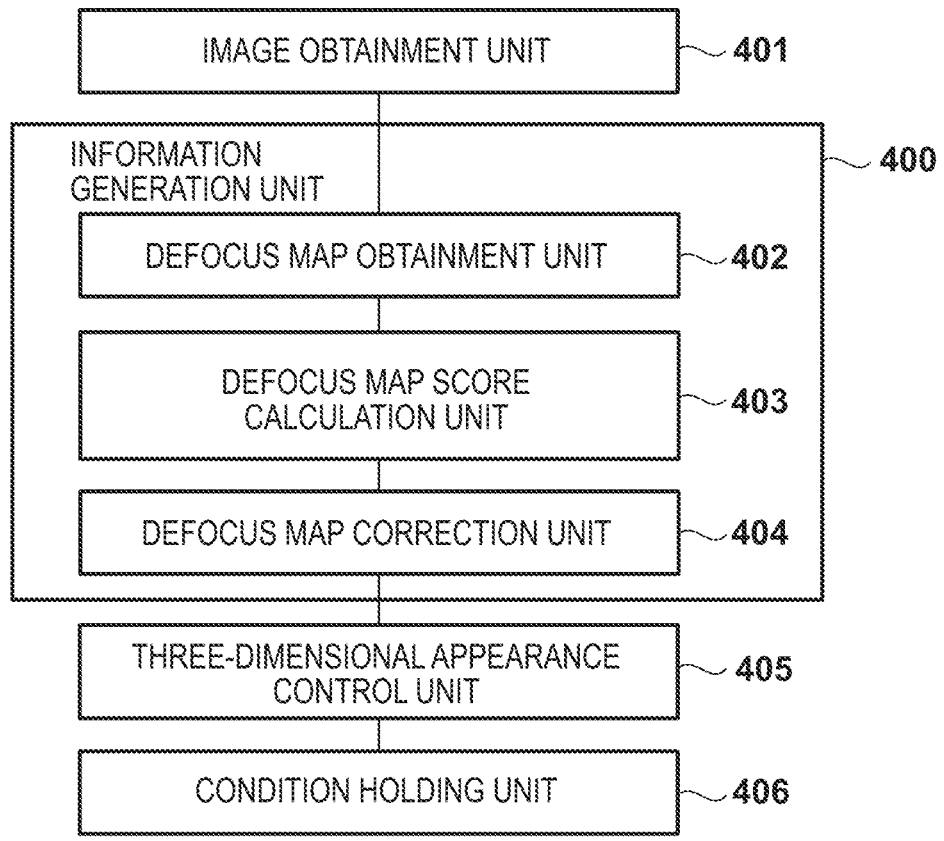
FIG. 4 is a view illustrating an example of a software configuration according to a first embodiment.

An example of a configuration of the image processing unit 109 according to a first embodiment of the invention of the present application is illustrated in FIG. 4. The image processing unit 109 may be executed by a dedicated circuit, for example. It may also be realized by providing a CPU and a storage area, and the CPU reading a program stored in the storage area and executing the program. Note that, in the present embodiment, configuration is such that the image processing unit 109 is provided with the output apparatus 102, but there is no limitation to this. For example, configuration may be such that a function corresponding to the image processing unit 109 is provided by the PC 101 or an image capturing apparatus (not shown), and the function is executed by cooperation with the output apparatus 102 or by obtaining information of the output apparatus 102.

The image processing unit 109 is configured by including an image obtainment unit 401, an information generation unit 400, a three-dimensional appearance control unit 405, and a condition holding unit 406. The information generation unit 400 is a unit for generating information (distance information) corresponding to the above-described distance from the in-focus plane 201, and is configured by including a defocus map obtainment unit 402, a defocus map score calculation unit 403, and a defocus map correction unit 404.

Figure 5:
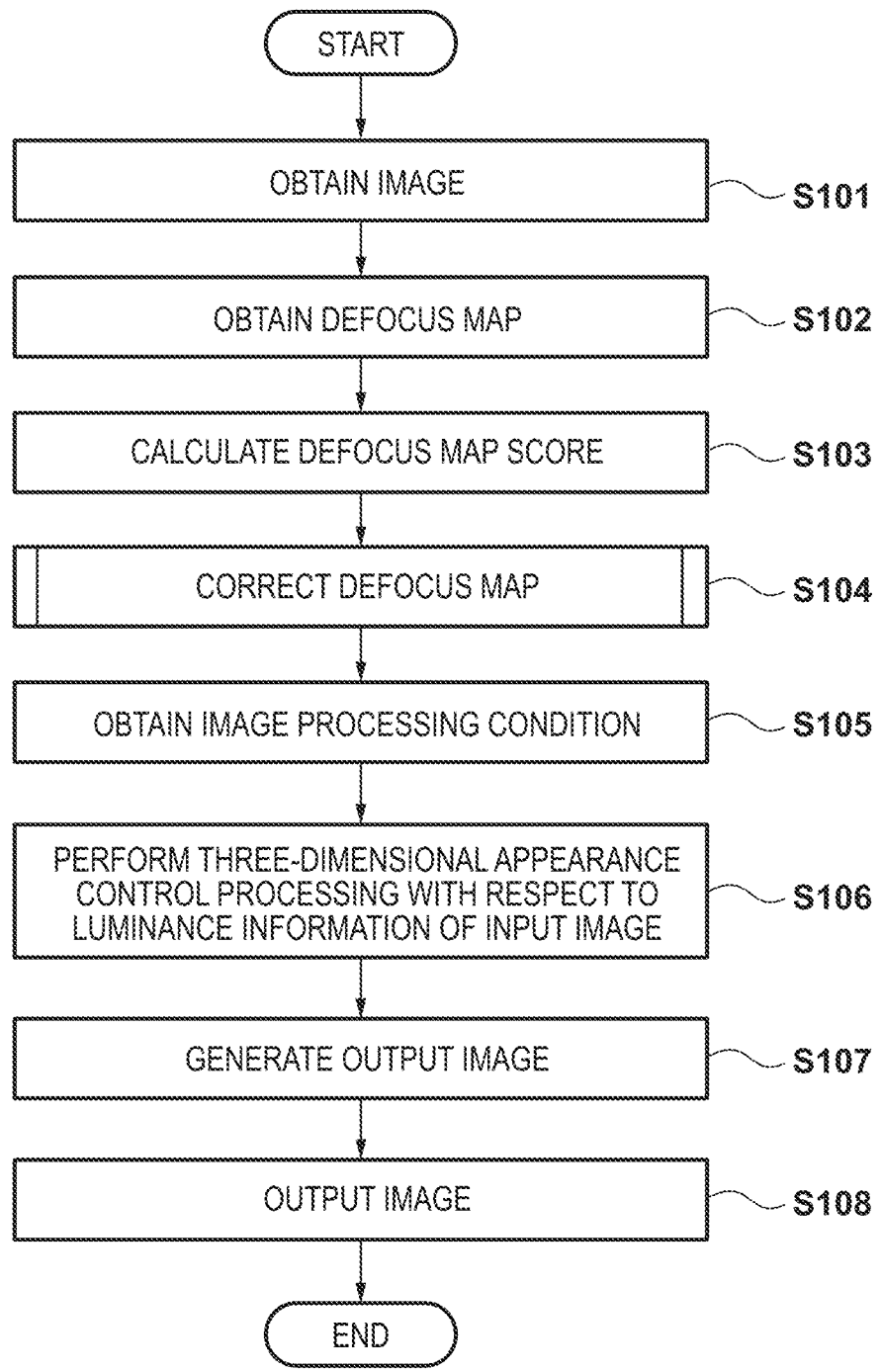
FIG. 5 is a view illustrating a flowchart of image processing according to the present invention.

The flowchart of FIG. 5 is used to describe the image processing in the image processing unit 109 according to the present embodiment.

In step S101, the image obtainment unit 401 obtains a captured input image. The input image indicates color information of a captured image. This corresponds to the input image data indicated by (1) described above.

In step S102, the defocus map obtainment unit 402 obtains a defocus map corresponding to a captured image. A defocus map is a map that records a distance from the in-focus plane 201 for each of one or more pixels of the input image. Note that the defocus map may be provided in advance in association with the input image, and the defocus map may be generated from the image shift amount 206 by the method described above.

In step S103, the defocus map score calculation unit 403 uses the color information of the input image obtained in the image obtainment unit 401 and the defocus map obtainment unit 402 to calculate a score of the defocus map for each pixel. For the color information here, an RGB value of a pixel may be used, for example.

In the present embodiment, the scores of the defocus map are evaluation values that indicate, for each pixel, a reliability (accuracy) of a value that the defocus map has. As described above, if the image shift amount 206 or the like is used to calculate distance information (information corresponding to the distance from the in-focus plane 201) such as the defocus amount 205, an area where there is high contrast, such as an edge portion of an image, is likely to have an image shift amount be uniquely determined. This is because, in the case of an area with high contrast, it is possible to clearly identify that there is a high correlation value at a certain image shift amount. In contrast, a flat portion of an image (an area with low contrast) has poor change of a correlation value at any image shift amount, and it is unlikely for the image shift amount to be uniquely determined. From this, it is understood that the defocus amount obtained from an area having high contrast in the input image has relatively high reliability, and the defocus amount obtained from an area having low contrast has relatively low reliability. In other words, a case where it is possible to identify a high correlation means that accuracy of the distance information for a corresponding pixel is high.

In the present embodiment, contrasts calculated for each area in an image are reflected to scores of a defocus map. A method for performing filter processing on an image is a representative example of a method for obtaining contrast from an image. In such a case, it is possible to obtain a pixel having a high contrast by using a value obtained using a filter as typified by the following equations. Note that the filter is not limited to the following equations, and it is sufficient if the filter is able to obtain a pixel having a high contrast.

$$g_x(i, j) = \frac{-i}{2\pi\sigma^4}\exp\left(-\frac{(i^2+j^2)}{2\sigma^2}\right) \quad (4)$$

$$g_y(i, j) = \frac{-j}{2\pi\sigma^4}\exp\left(-\frac{(i^2+j^2)}{2\sigma^2}\right) \quad (5)$$

$$I_x = g_x * I \quad (6)$$

$$I_y = g_y * I \quad (7)$$

$$\text{Score}(x, y) = \sqrt{I_x^2(x, y) + I_y^2(x, y)} \quad (8)$$

"I" indicates an image obtained by extracting luminance components from color information of an input image. "$g_x$" and "$g_y$" indicate filters in the x and y direction in the image. It is assumed that the x and y directions are already defined in the image. "i" and "j" respectively indicate distances, following the x and y directions, from the center of the filter. "$\sigma$" indicates a filter parameter. "*" indicates a convolution operation. "Score" indicates a score of an obtained defocus map.

After the scores of the defocus map are calculated, in step S104, the defocus map score calculation unit 403 corrects the defocus map. In this processing, a value of the defocus map is weighted in accordance with the value of the score calculated in step S103. Here, a value of a defocus map with a relatively low score is corrected by a value of the defocus map with a relatively high score. Specifically, by defining a peripheral area window size, a surrounding area is decided based on a pixel of interest and the peripheral area window size W. A value of the defocus map after the correction with respect to the pixel of interest can be calculated by weighting as the following equation using the value of the defocus map for each pixel of the surrounding area and the value of the score.

$$def'(x, y) = \frac{\sum_{k=0}^{N-1} \text{Score}(x+i_k, y+j_k) \cdot def(x+i_k, y+j_k)}{\sum_{k=0}^{N-1} \text{Score}(x+i_k, y+j_k)} \quad (9)$$

"$i_k$" and "$j_k$" indicate relative positions of a surrounding pixel with respect to the pixel of interest. "N" indicates a number of pixels of the surrounding area which is decided in accordance with the peripheral area window size. "def(x, y)" indicates the value of the defocus map before correction with respect to the pixel of interest at the coordinate positions (x, y). "def'(x, y)" indicates the value of the defocus map after the correction with respect to the pixel of interest at the coordinate positions (x, y).

[Three-Dimensional Appearance in Output Apparatus]

The output characteristic of the output apparatus 102 that influences the sharpness, and control of the three-dimensional appearance will now be described. As described above, when looking at a two-dimensional image shot by an image capturing apparatus such as a camera, a human recognizes the sense of depth and three-dimensional appearance of an image from the difference between the sharpness of a tolerable in-focus area including a focused in-focus area and that of a defocused intolerable in-focus area.

In contrast, when an image is output through an output apparatus such as a printer described in the present embodiment, the sharpness of the image degrades owing to, for example, degradation of the sharpness of the image by a print medium or ink bleeding, or resolution conversion processing of resizing input image data into a print medium size (print size). The sharpness of an output image similarly degrades even on another type of output apparatus such as a display or a projector.

The sharpness of an input image, which depends on the output characteristic of the output apparatus, greatly changes in the (in-focus) tolerable in-focus area where the sharpness of input data is high, and hardly changes in the (defocused) intolerable in-focus area where the sharpness of input data is low. In other words, the amount of change of the sharpness is different between areas. For this reason, an output image does not simply maintain the sharpness relationship between the tolerable in-focus area and the intolerable in-focus area that influences the three-dimensional appearance of an input image.

Figure 7A:
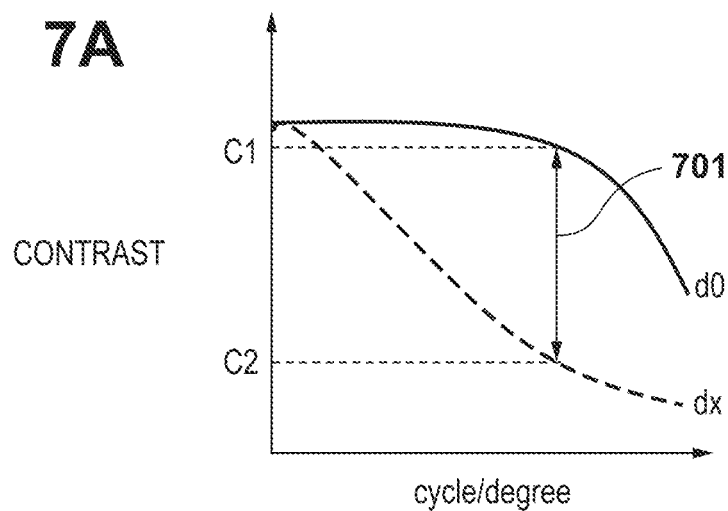
FIG. 7A to FIG. 7C are views for describing a relation between contrast and spatial frequency, according to the present invention.
Figure 7B:
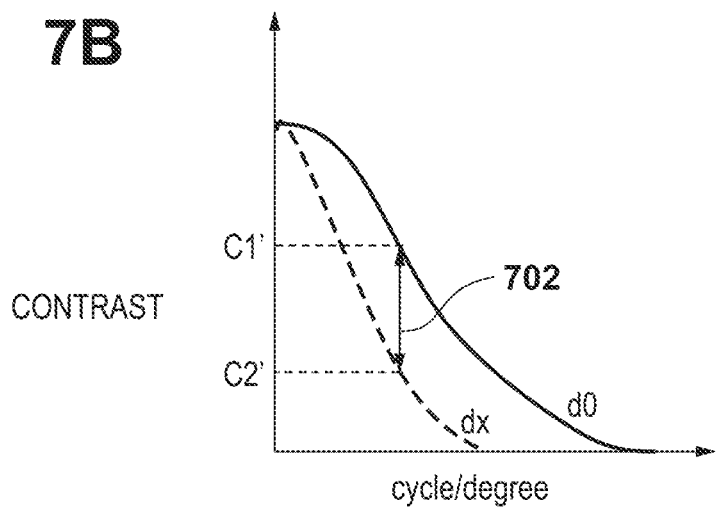
Figure 7C:
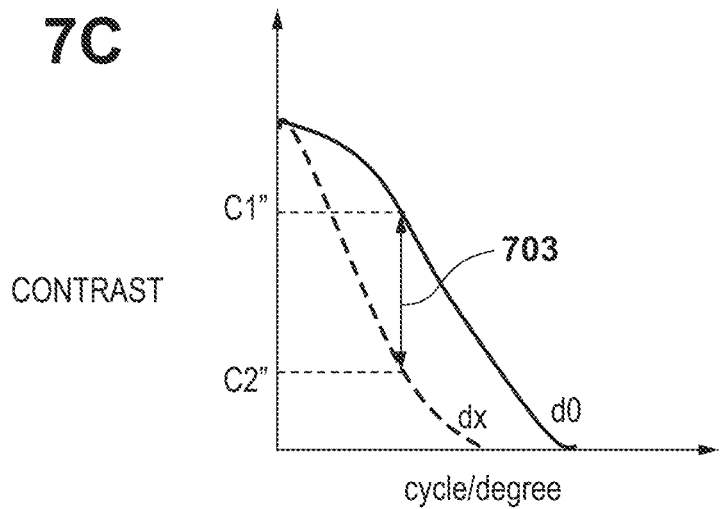

Description is given in further detail using the graphs of FIG. 7A to FIG. 7C. In FIG. 7A to FIG. 7C, for descriptive convenience, an image is treated as an image in which the spatial frequency characteristic of the image in the in-focus area and the spatial frequency characteristic of the image corresponding to a specific defocus amount included in the out-of-focus area have a peak at the same frequency. In addition, in the present embodiment, characteristics for when an image is subject to enlargement processing to resize it to a print medium size and then is output by a printer are referred to as output characteristics. Although the relationship between the sharpness of the tolerable in-focus area and the intolerable in-focus area is described in the present embodiment by giving enlargement processing as an example of resolution conversion processing, the resolution conversion processing may be unmagnification processing or reduction processing.

FIG. 7A to FIG. 7C illustrate the relationship between the contrast and the spatial frequency characteristic of an image, with the ordinate indicating contrast and the abscissa indicating the spatial frequency [cycle/degree]. A solid line indicates change for the defocus amount d0 indicated by FIG. 6, and a broken line indicates change for the defocus amount dx indicated by FIG. 6. In input image data that has a three-dimensional appearance due to a defocused state, at specific spatial frequencies, a contrast value C1 representing a sharpness of input image data in the in-focus area and a contrast value C2 representing a sharpness in the out-of-focus area have a relationship shown in FIG. 7A. When this input image is enlarged, the contrast values C1 and C2 change to C1' and C2', as shown in FIG. 7B. Here, as described above, it is assumed that enlargement processing for resizing the input image data to the print medium size is performed.

As is apparent from FIG. 7A and FIG. 7B, the change amount of the sharpness of the input image data is different between the in-focus area and the out-of-focus area in accordance with the output characteristic of the output apparatus. Accordingly, a sharpness difference (a relationship 702 between the contrast values C1' and C2') that influences the three-dimensional appearance becomes smaller than a sharpness difference (a relationship 701 between the contrast values C1 and C2) in the input image data, and an output image for which an appropriate three-dimensional appearance is not obtained is produced. In other words, to obtain an output image with a three-dimensional appearance similar to that of the input image, it is necessary to properly control the sharpness based on an image defocused state corresponding to the above-described defocus amount and the output characteristic of the output apparatus that influences the sharpness. In other words, it is necessary to perform control so that, in accordance with the output characteristic, the difference in sharpness (relationship between contrasts) approaches or is maintained at the state of the input image.

In the present embodiment, the sharpness of the image is properly controlled using the relationship between the defocus amount and the three-dimensional appearance control amount based on the output characteristic of the output apparatus set in an image output condition. The contrast values of the in-focus area and out-of-focus area have a relationship in FIG. 7C in an output image obtained in accordance with this control. In FIG. 7C, C1" denotes the contrast value of the in-focus area and C2" denotes the contrast value of the out-of-focus area. As shown in FIG. 7C, in an output image having undergone three-dimensional appearance control processing based on the image output condition according to the present embodiment, the sharpness difference (a relationship 703) that influences the three-dimensional appearance of an image becomes larger than the sharpness difference (the relationship 702) obtained when no processing is performed. Because the sharpness difference (the relationship 701 between the contrast values C1 and C2) in the input image is thus approached, in the present embodiment, it is also possible to obtain an output image with a proper three-dimensional appearance close to that of the input image.

In FIG. 7A to FIG. 7C, contrasts at a point of a spatial frequency of an image in the in-focus area and a point of the spatial frequency of an image corresponding to a specific defocus amount included in the out-of-focus area are compared for descriptive convenience. However, the above-described relationship holds even for images corresponding to the in-focus area and other defocus amounts in the intolerable in-focus area. Also, the above-described relationship is established even at two points of a spatial frequency of an image corresponding to a specific defocus amount included in a tolerable in-focus area and an image corresponding to a specific defocus amount included in the intolerable in-focus area.

The contrast value has been taken up as an image characteristic that influences the sharpness of an image. As for a change of the sharpness of an image in the in-focus area and the out-of-focus area depending on the output characteristic of the output apparatus, it is obvious that the same relationship can also be explained with a spatial frequency characteristic representing the sharpness.

Next, description is given regarding the three-dimensional appearance control unit 405 that the image processing unit 109 has. The three-dimensional appearance control unit 405 controls the sharpness of input image data using a sharpness control parameter set in the condition holding unit 406.

Information regarding a three-dimensional appearance control amount with respect to each defocus amount is set in the condition holding unit 406.

FIGS. 8A to 8D illustrate the relationship between the defocus amount and the three-dimensional appearance control amount that is set in the condition holding unit 406. In FIGS. 8A to 8D, the ordinate indicates a three-dimensional appearance control amount, and the abscissa indicates a defocus amount. It is assumed that the defocus amounts in FIGS. 8A to 8D corresponding to those in FIG. 6. Note that a method of creating an image processing condition will be described below. A processing flow is described in detail below using the relationship illustrated in FIGS. 8A to 8D.

The flow of FIG. 5 is returned to. In step S105, the three-dimensional appearance control unit 405 obtains an image processing condition held in the condition holding unit 406.

In step S106, the three-dimensional appearance control unit 405 performs sharpening processing by applying a three-dimensional appearance control amount set in the image processing condition (FIGS. 8A to 8D) while referring to a defocus amount in the defocus map (FIG. 6) for a processing target pixel with respect to luminance information of each pixel of input image data. The sharpening processing uses, for example, a Laplacian of Gaussian filter as indicated in the following equation.

$$h(i, j, def') = \beta(def') \frac{i^2 + j^2 - 2\sigma^2}{2\pi\sigma(def')^2} \exp\left[-\frac{i^2 + j^2}{2\sigma(def')^2}\right] \quad (10)$$

"σ" and "β" indicate filter parameters with respect to a three-dimensional appearance control amount, and each is set to a value in accordance with a defocus amount. The parameters σ and β may be set in advance by an LUT (look-up table) method, and may be calculated using a relationship expression with respect to a defocus amount. Other variables are similar to in the equations described above.

Sharpening processing that uses the Laplacian of Gaussian filter described above is described as in the following equation.

$$Out=I-h*I \quad (11)$$

"I" indicates an input image, and "Out" indicates an image after sharpening processing. "*" indicates a convolution operation.

In FIGS. 8A to 8D, β=β1 represents a control amount for the in-focus area of an input image. In FIGS. 8A to 8D, β1 indicates a maximum three-dimensional appearance control amount. A defocus amount d1 is a value at the boundary between the tolerable in-focus area 505 and the intolerable in-focus area 506 shown in FIG. 6. A defocus amount d2 indicates a maximum defocus amount included in the defocus map (FIG. 6). Accordingly, a defocus amount takes a value in the range from d0 (=0) to d2. In addition, the three-dimensional appearance control amount takes a value in the range from β1 to 0.

Figure 8A:
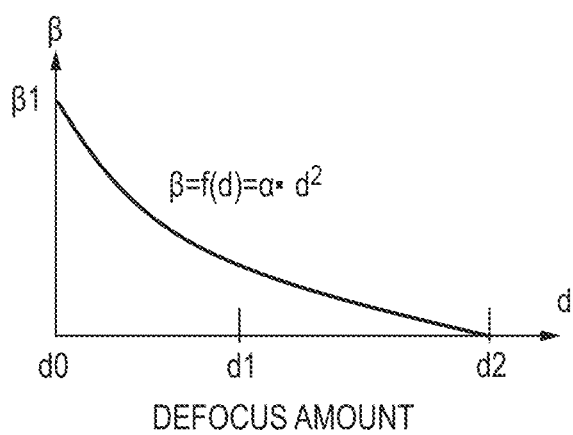
FIGS. 8A to 8D are views for describing a relation between a three-dimensional appearance control amount and a defocus amount, according to the present invention.
Figure 8B:
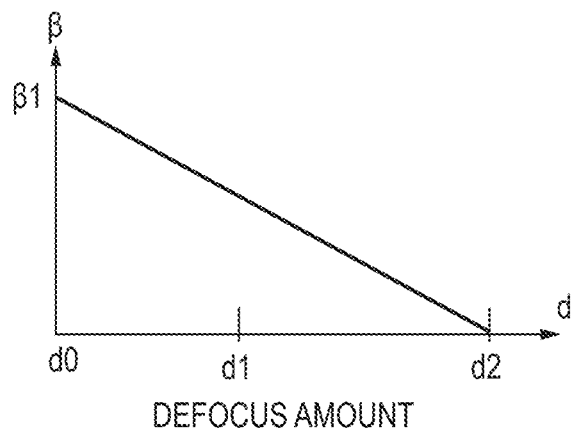
Figure 8C:
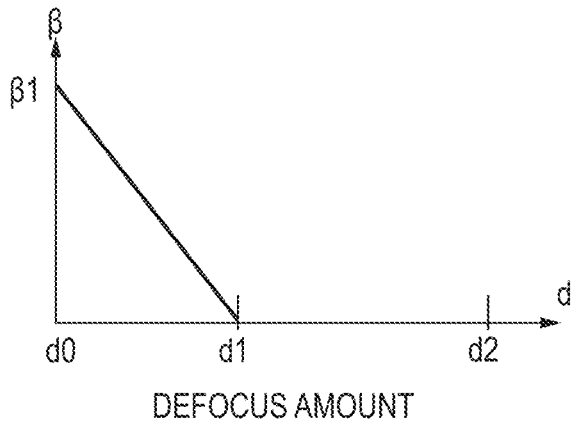

To obtain a proper three-dimensional appearance considering the output characteristic of the output apparatus in an output image, an image processing condition is set to maximize the three-dimensional appearance control amount for the pixels of the in-focus area 503 in an input image, as shown in FIG. 8A to FIG. 8C. In other words, setting is such that the three-dimensional appearance control amount β1 with respect to the defocus amount d0 is a maximum. It is desirable to set the control amount for the out-of-focus area 504 so that the control amount becomes smaller as the defocus amount becomes larger (as it approaches d2), that is, the control amount monotonously decreases. If the defocus amount def, as information corresponding to the distance from the in-focus plane 201, is a value that corresponds to an amount of bokeh of an image, the defocus amount and the three-dimensional appearance control amount have a non-linear relationship as in FIG. 8A. The line illustrated in FIG. 8A is indicated by β=f(d)=α·d2. The "α" here indicates a conversion coefficient. The formula of this curve is an example, and another formula may be used. If the defocus amount corresponds to the image shift amount 206, a linear relationship is held, as in FIG. 8B.

In addition, the three-dimensional appearance control amount β may be set to be "0" for the intolerable in-focus area 506 (the range of d1 to d2), as shown in FIG. 8C. Even in such a case, the sharpness difference between the tolerable in-focus area 505 and the intolerable in-focus area 506, as described above, comes close to the sharpness difference between the tolerable in-focus area 505 and the intolerable in-focus area 506 in the input image, and the three-dimensional appearance of the output image can be obtained. The three-dimensional appearance control amount described above differs in accordance with characteristics of the print medium, ink (print agent) characteristics, the size of the print medium, and the like. This is because, for each print medium or ink characteristic, a degree of a reduction of the sharpness of an image differs in accordance with bleeding or the like of ink, and the scaling ratio of the resolution conversion processing also differs in accordance with the print medium size.

Figure 9A:
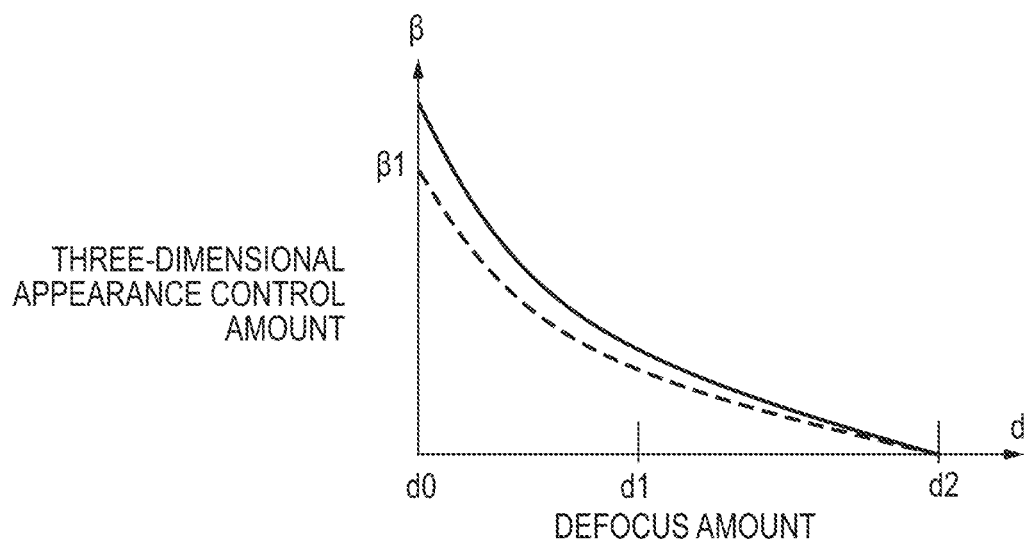
FIG. 9A and FIG. 9B are views for describing variation of a three-dimensional appearance control amount in accordance with printing, according to the present invention.
Figure 9B:
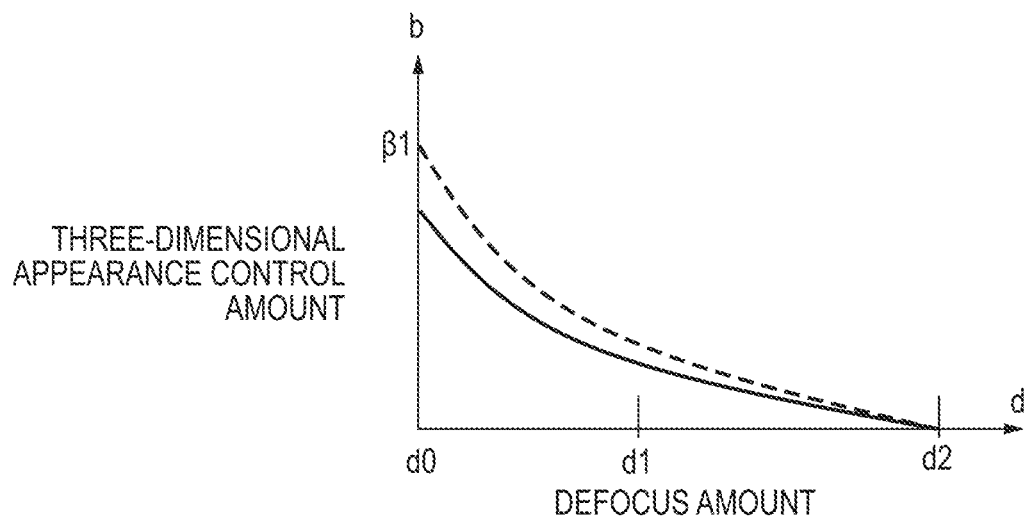

FIG. 9A and FIG. 9B are graphs illustrating examples of causing of the three-dimensional appearance control amount to change depending on, for example, the characteristics of a print medium, as described above. In FIG. 9A and FIG. 9B, a solid line represents a three-dimensional appearance control amount with respect to a defocus amount when outputting under a condition different from that in FIG. 8A. In FIG. 9A and FIG. 9B, a broken line corresponds to the solid line of FIG. 8A. For example, FIG. 9A illustrates a case where the three-dimensional appearance control amount is high because ink bleeding is high or where the scaling ratio is high, in comparison to FIG. 8A. Conversely, FIG. 9B illustrates a case where the three-dimensional appearance control amount is low because ink bleeding is low or where the scaling ratio is low, in comparison to FIG. 8A.

Note that the filter used in sharpness processing is not limited to the Laplacian of Gaussian filter described above, and there is a method of adjusting an intensity of a specific filter by the sharpness control amount. For example, the specific filter may be one created by obtaining the inverse characteristic of degradation information of the sharpness of the output apparatus.

Figure 8D:
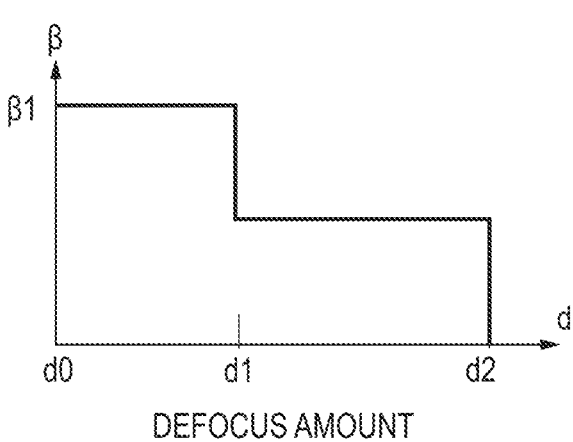

Sharpening processing has been taken as an example of processing for controlling the sharpness in the above description, but this processing may be contrast processing. More specifically, luminance conversion is performed to increase the contrast of the luminance value of each pixel of input image data in the tolerable in-focus area 505 (the range of d0 to d1) including the in-focus area 503, as shown in FIG. 8D. As for the luminance conversion, there are a method using conversion formula in which the three-dimensional appearance control amount is a coefficient, and a method of increasing the contrast by equalizing a histogram generated from the luminance value of each pixel of input image data, as described above, but of course there is no limitation to these methods as long as the contrast can be controlled.

Since sharpness processing and contrast processing can control the sharpness of an output image, either processing may be selected in accordance with the characteristic of an image output apparatus and both of them may be used in combination.

[Image Processing Condition]

Figure 10:
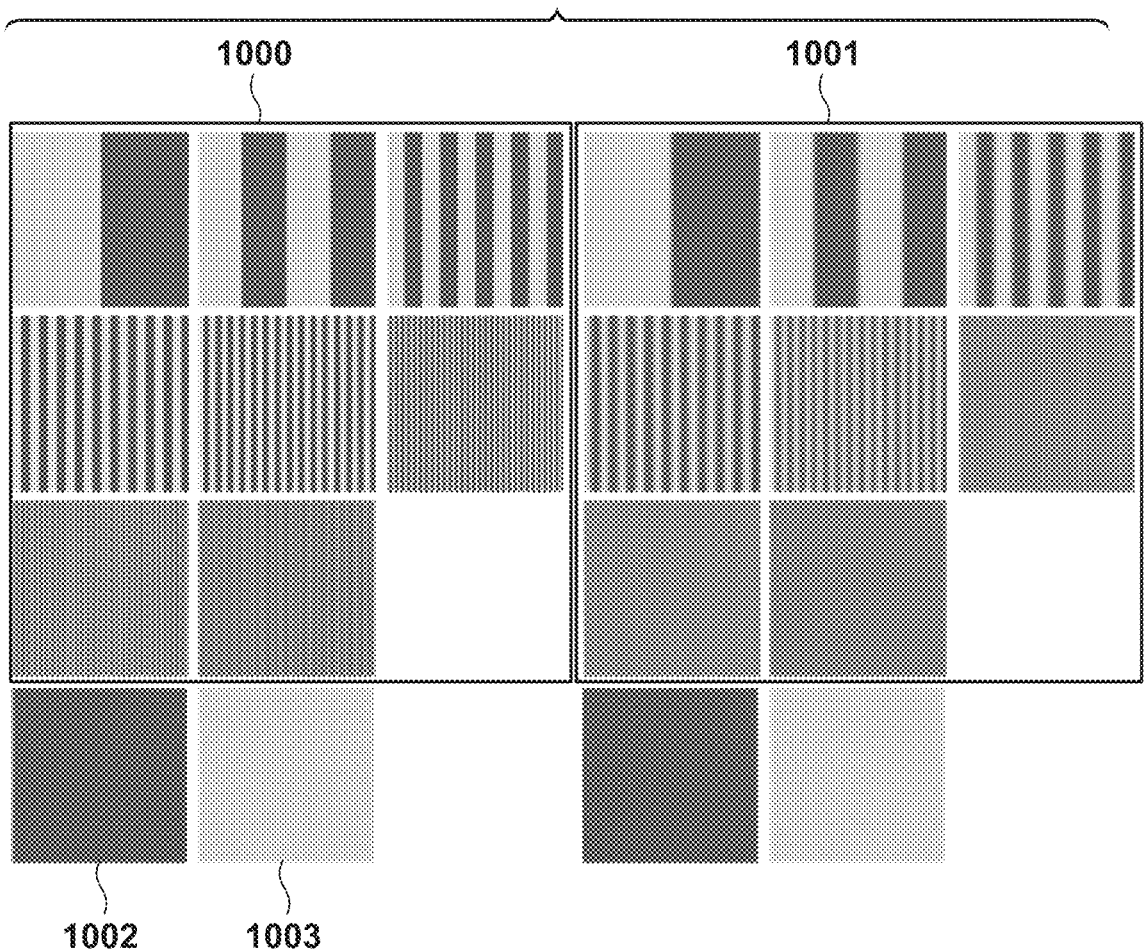
FIG. 10 is a view illustrating an example of a pattern used when generating an image processing condition according to the present invention.

A method of creating an image processing condition held by the condition holding unit 406 will be described here. The image processing condition here corresponds to a conversion method as illustrated by FIGS. 8A to 8D, and is set based on the output characteristic of an output apparatus. For example, an image for measurement as shown in FIG. 10 is output from the output apparatus 102 which is a printer, a display, a projector or the like. Then, a parameter to be set as an image processing condition is calculated from the frequency characteristic (MTF characteristic) of the output image from the output apparatus 102 that is obtained using a measurement apparatus (not shown). Note that configuration may be taken to use a method of calculating the MTF characteristic of the output apparatus 102 from an image obtained by simulating, on the PC 101, each image processing when generating the output image. In other words, in the present embodiment, the three-dimensional appearance control amount β varies in accordance with the output characteristic of the output apparatus and the value of the distance information.

An image shown in FIG. 10 is configured by an image group 1000 corresponding to the in-focus plane 201 and an image group 1001 expressed in a defocused state corresponding to an amount of bokeh of an input image with a certain defocus amount. More specifically, the images illustrated in FIG. 10 are charts including a plurality of rectangular patterns or sinusoidal patterns of different frequencies, and uniform patterns 1002 and 1003. Note that the image illustrated in FIG. 10 is a plurality of sinusoidal patterns having differing frequencies. The uniform patterns are configured by pixel values having the maximum pixel value and the minimum value for each sinusoidal pattern.

Figure 11:
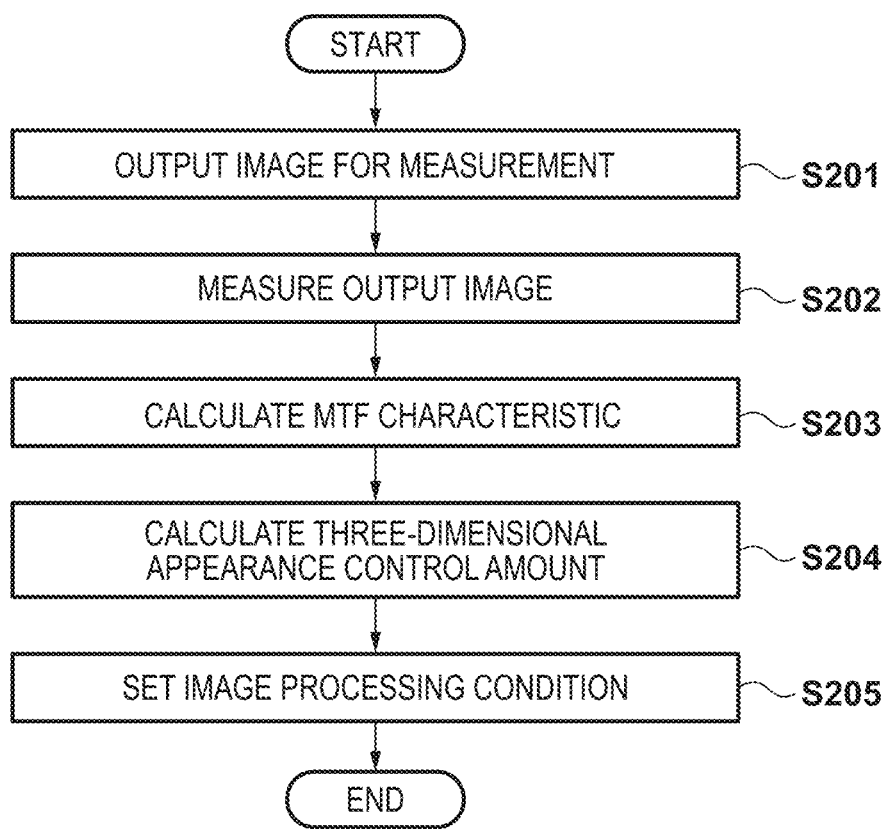
FIG. 11 is a flowchart of processing for generating an image processing condition according to the present invention.

A method of creating an image processing condition is described using the flowchart of FIG. 11. The processing flow is executed by the output apparatus 102 and an information processing apparatus such as the PC 101 cooperating. Note that a timing for creating an image processing condition is not particularly limited, and configuration may be taken such that it is executed in advance before shipment of the output apparatus 102, and generation information thereof is held in the condition holding unit 406 of the output apparatus 102, and is updated as appropriate. In addition, it is assumed that, to execute this processing, a measurement apparatus (not shown) for measuring an output result of the output apparatus 102 is used.

First, in step S201, the image for measurement shown in FIG. 10 is output from the output apparatus 102.

Then, in step S202, the image for measurement output from the output apparatus 102 is measured using the measurement apparatus (not shown) to obtain information necessary to calculate the MTF characteristic. The necessary information here is assumed to differ when with a method of calculating the MTF characteristic.

In step S203, an information processing apparatus (not shown) calculates the MTF characteristic using information obtained by the measurement apparatus (not shown). For example, if the image for measurement is a sinusoidal pattern, the MTF characteristic can be calculated by Equations (12) to (14) below, or by Equation (15). The MTF value indicated by the following equations means an absolute value of an optical transfer function. It is desirable to use Equation (15) if the average lightness of an output image changes.

$$MTF(u) = \frac{C(u)}{C'} \quad (12)$$

$$C(u) = \frac{\text{Max}(u) - \text{Min}(u)}{\text{Max}(u) + \text{Min}(u)} \quad (13)$$

$$C' = \frac{R_1 - R_2}{R_1 + R_2} \quad (14)$$

$$MTF(u) = \frac{\text{Max}(u) - \text{Min}(u)}{R_1 - R_2} \quad (15)$$

"u" indicates the frequency of a sine wave. "Max(u)" indicates maximum reflectance of a sinusoidal pattern that changes depending on the frequency. "Min(u)" indicates minimum reflectance of a sinusoidal pattern that changes depending on the frequency. "$R_1$" and "$R_2$" indicate reflectances of a uniform pattern ($R_1 > R_2$).

Note that the $R_1$ and $R_2$ values used in equation (12) and equation (15) described above are reflectances, but the luminance, density, or device RGB value may be used instead. The measurement apparatus (not shown) can be, for example, a scanner, a digital camera, or a microscope if the output apparatus 102 is a printer. It is possible to use a digital camera if the output apparatus 102 is a display or a projector.

Also, if an image for measurement has a rectangular wave pattern, the MTF characteristic of the output apparatus 102 is represented by a contrast transfer function (CTF) obtained by applying Equation (12) or Equation (15). Alternatively, an MTF value converted from a CTF value using the Coltman correction formula may be used.

Figure 12:
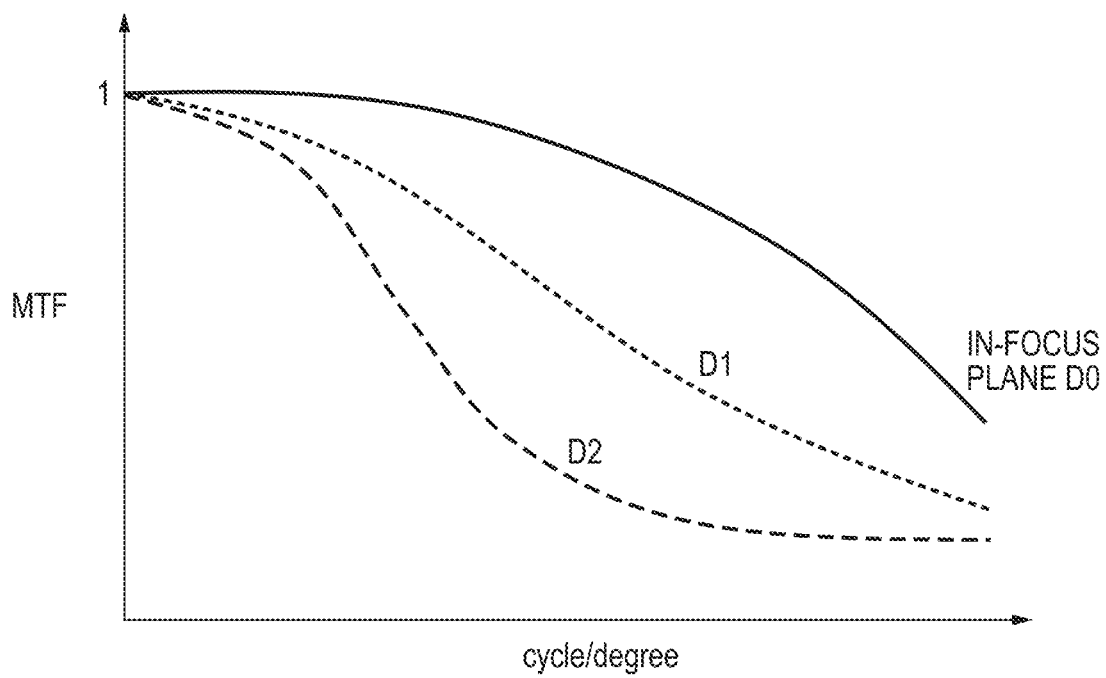
FIG. 12 is a view for describing a frequency characteristic of an image according to the present invention.

By the above-described method, the frequency characteristics (MTF characteristics) of each image in the image group 1001 corresponding to the in-focus plane 201 included in the image for measurement and the image group 1000 corresponding to any defocus amount are obtained. FIG. 12 illustrates an example of the frequency characteristics. In FIG. 12, the ordinate indicates the MTF characteristic, and the abscissa indicates the spatial frequency [cycle/degree]. In FIG. 12, a solid line (D0) represents the frequency characteristic of the image group 1000 corresponding to the in-focus plane 201. A dotted line (D1) represents the frequency characteristic of the image group 1001 corresponding to the defocus amount d1 included in the tolerable in-focus area 505. A broken line (D2) represents the frequency characteristic of the image group 1001 corresponding to the defocus amount d2 included in the intolerable in-focus area 506.

An MTF characteristic can therefore be obtained for each defocus amount. That is, the output characteristic of the output apparatus 102 regarding the sharpness for each defocus amount is obtained.

In step S204, the information processing apparatus (not shown) calculates the three-dimensional appearance control amount so that the sharpness or frequency characteristic of the in-focus area of the output image is restored by sharpening processing to the sharpness or frequency characteristic of the input image.

To obtain, in an output image, a proper three-dimensional appearance similar to that of the input image, the sharpness difference between the tolerable in-focus area and the intolerable in-focus area in the output image needs to come closer to the sharpness difference between the tolerable in-focus area and the intolerable in-focus area in an input image in the case of applying three-dimensional appearance control processing, compared to the case of not applying this processing. In other words, configuration may be such that in order to appropriately control the difference in sharpness between the tolerable in-focus area and the intolerable in-focus area in the output image, the three-dimensional appearance control amount is set in accordance with an output characteristic that affects the sharpness of the output apparatus 102 for each defocus amount. Accordingly, in the present embodiment, the three-dimensional appearance control amount is set so that the sharpness or frequency characteristic of the in-focus area of the output image at a specific frequency is restored by sharpening processing on the sharpness or frequency characteristic of the input image. Similarly, in the present embodiment, a restoration amount is calculated from the MTF characteristic obtained for each defocus amount for an out-of-focus area as well and made to be the three-dimensional appearance control amount. With this, the three-dimensional appearance control amount is calculated for the defocus amount shown in FIGS. 8A to 8D.

Methods for a relationship between the defocus amount and the sharpness, include setting a relationship expression in which a defocus amount is taken as an input and a three-dimensional appearance control amount is set as an output, as shown in FIGS. 8A to 8D, or selecting a parameter according to a LUT. Note that the method of setting the relationship is not limited to these and may be any method if it is possible to calculate the three-dimensional appearance control amount with respect to a defocus amount.

The three-dimensional appearance control amount is not limited to a value for restoring the MTF characteristic. A proper three-dimensional appearance is obtained in an output image if it is satisfied that the sharpness difference when performing sharpening processing in accordance with a defocus amount and sharpening control amount based on the output characteristic of the output apparatus 102 becomes larger than the sharpness difference when not performing the processing.

Furthermore, when the control amount β1 at the in-focus plane 201 illustrated in FIGS. 8A to 8D is set to restore the MTF characteristic of an image to a specific value (for example from 0.8 to 1.2), an image for which the sharpness of the in-focus plane 201 is desirable is obtained in the output image.

In the present embodiment, description is given of an example of the relationship between the defocus amount and the three-dimensional appearance control amount that is set as the image processing condition. However, there is no limitation to this, an image processing condition may be set as the relationship between the three-dimensional appearance control amount and the image shift amount 206, or the distance 304 from the in-focus plane to the object, which were given as information (distance information) corresponding to the distance from the in-focus plane 201.

In step S205, the information processing apparatus (not shown), based on the three-dimensional appearance control amount calculated in step S204, sets an image processing condition derived from an output characteristic that relates the sharpness of the output apparatus in accordance with defocus amount to the condition holding unit 406, and causes the condition holding unit 406 to hold it. This processing flow then ends. It is possible to control the three-dimensional appearance of an output image by using the image processing condition to process input image data.

Effect of First Embodiment

Values of a defocus map, which is obtained from an input image, are corrected to relatively low scores by using the scores (value reliability) of the defocus map to correct the values of the defocus map. Here, it is possible to improve the accuracy of the defocus map, and improve the accuracy of information that corresponds to a distance from the in-focus plane. As a result, it becomes easier to perform desired three-dimensional appearance control with respect to an image.

Second Embodiment

Description is given regarding a second embodiment according to the present invention. For the second embodiment, the defocus map correction processing of step S104, which is illustrated in FIG. 5, differs from that of the first embodiment.

[Defocus Map Correction Processing]

Figure 13:
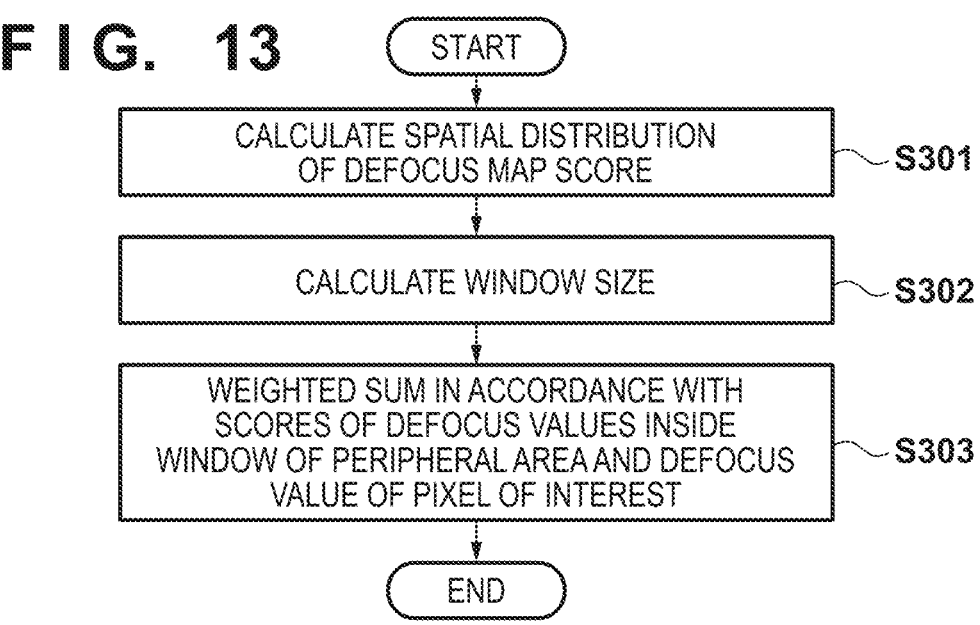
FIG. 13 is a flowchart of defocus map correction processing according to a second embodiment.

FIG. 13 illustrates a flowchart of defocus map correction processing according to the present embodiment.

In step S301, the defocus map score calculation unit 403 calculates a spatial distribution of a defocus map score. The spatial distribution of the defocus map score is something that describes a degree to which pixels with high scores are concentrated, which respect to one or more pixels. As a representative example of obtaining a spatial distribution of scores, it can be obtained in accordance with an average of scores per unit area.

$$\text{Density}(x, y) = \frac{1}{N} \sum_{k=0}^{N-1} \text{Score}(x + i_k, y + j_k) \qquad (16)$$

"N" indicates number of elements of a peripheral area. Note that a method of obtaining a spatial distribution of scores is not limited to Equation (16) described above. For example, configuration may be taken to obtain a spatial distribution by setting a threshold value for scores, and calculating how many scores higher than the threshold value are present in a unit area.

In step S302, the defocus map score calculation unit 403 decides a peripheral area window size for defocus map correction. The peripheral area window size may be the same as a window size W used in Equation (9) when correcting the defocus map, for example.

The more a value indicates that the spatial distribution of scores is high, the more defocus amounts with high accuracy being dense is indicated. In such a case, the larger the window size, the larger the change due to correction from an original defocus amount. Accordingly, in such a case, by making the peripheral area window size W smaller, the original defocus amount is made to not change. In contrast, the more a value indicates that the spatial distribution of scores is low indicates that there are fewer defocus amounts with high accuracy. In such a case, by increasing the peripheral area window size W, it is possible to correct the defocus amount using the defocus amounts with higher accuracy. In other words, it is sufficient to make the peripheral area window size W smaller the higher the spatial distribution of scores.

In step S303, the defocus map score calculation unit 403 uses the peripheral area window size W decided for each of one or more pixels in step S302 to correct the defocus map.

Correction of the defocus map is performed in accordance with Equation (9) described above. Note that another equation may be used as the equation used to correct the defocus map.

Effect of Second Embodiment

By deciding a value for the peripheral area window size W based on the spatial distribution of the defocus map, for an area in which defocus amounts with high accuracy are dense, it becomes easier to employ the original defocus amounts that have high accuracy. However, in a case where there are few defocus amounts with high accuracy in the surroundings, by increasing the window size, it is possible to correct the defocus amount of a pixel of interest using defocus amounts that have high accuracy. As a result, by virtue of the present embodiment, the accuracy of a corrected defocus amount increases.

Third Embodiment

Description is given regarding a third embodiment according to the present invention. For the third embodiment, detail of the defocus map correction processing of step S104, which is illustrated in FIG. 5, differs from that of the first embodiment.

Figure 14:
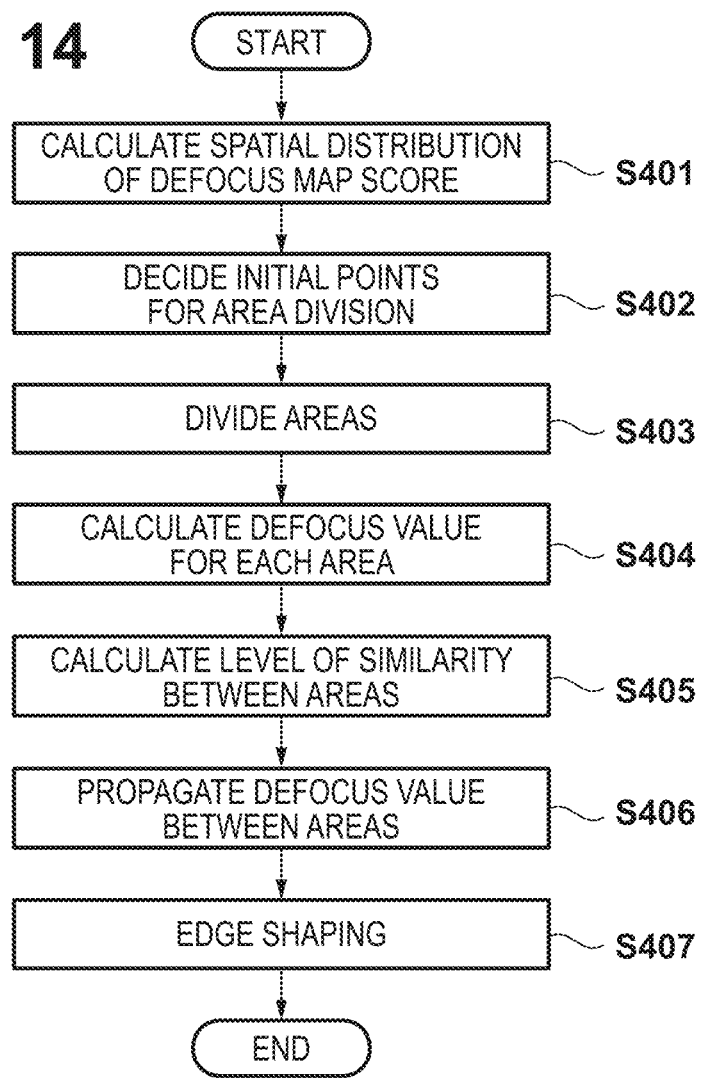
FIG. 14 is a flowchart of defocus map correction processing according to a third embodiment.

FIG. 14 illustrates a flowchart of defocus map correction processing according to the present embodiment.

In step S401, the defocus map score calculation unit 403 calculates a spatial distribution of a defocus map score. Details of this processing are similar to step S301 of FIG. 13 described in the second embodiment.

In step S402, the defocus map score calculation unit 403 calculates positions of initial points for area division, in order to perform area division on a defocus map. In this processing, the position of the initial points are decided based on the spatial distribution of the defocus map obtained in step S401. In other words, the more that the spatial distribution of the defocus map indicates a high value, the more initial points are arranged to more finely divide the area, and the more that the spatial distribution of the defocus map indicates a low value, the fewer initial points are arranged so as to roughly divide the area. The number of initial points and an arrangement method may be defined already in accordance with a spatial distribution, and calculation equation for deciding them may be used, for example.

In step S403, the defocus map score calculation unit 403 divides the area based on the area division initial points decided in step S402. A method for area division may, for example, be that indicated in Achanta, et al, IEEE Transactions on Pattern Analysis and Machine Intelligence 2012 "SLIC Superpixels Compared to State-of-the-Art Superpixel Methods." In addition, division may be performed into simple rectangular shapes. An area division method is not limited to that described above, and another method may be used.

In step S404, the defocus map score calculation unit 403 calculates, for each area, a defocus amount that typifies the area. The defocus amount that typifies the area is obtained in accordance with the median value of defocus amounts inside the area. However, the defocus amount for a respective area is given as "error" in the following cases.

If dispersal of defocus amounts inside an area exceeds a predetermined threshold value that has been defined in advance.

If, from out of the defocus amounts in an area, a proportion of defocus amounts having a score that exceeds a predetermined threshold value does not exceed a predetermined threshold value that has been defined in advance.

It is assumed that the aforementioned predetermined threshold values are held in a storage area.

In step S405, the defocus map score calculation unit 403 obtains a level of similarity between areas. The level of similarity between areas can be calculated using the following equation, in accordance with a histogram intersection between adjacent areas, for example.

$$\text{Similarity}(l, m) = \begin{cases} \dfrac{\sum_{i=0}^{N_B-1} \min(hist_l(i), hist_m(i))}{\sum_{i=0}^{N_B-1} hist_l(i)} & \text{if } def_m \neq error \\ 0 & \text{else} \end{cases} \quad (17)$$

"l" and "m" represent indexes of respective areas, where an area m and an area 1 are adjacent. "$hist_l$" indicates a histogram of the area 1. "$hist_m$" indicates a histogram of the area m. "NB" is a number of bins of a histogram. A histogram is assumed to be created in advance from an input image and an area division result. In addition, the level of similarity between an area where the defocus amount is set to "error" and other areas is set to "0".

In step S406, the defocus map score calculation unit 403 causes a value for defocus calculated for each area to be propagated based on the level of similarity between areas.

$$def_l = \frac{\sum_{m=0}^{N_S-1} \text{Similarity}(l, m) \cdot def_m}{\sum_{m=0}^{N_S-1} \text{Similarity}(l, m)} \quad (18)$$

"$N_S$" indicates a number of levels of similarity. "$def_m$" indicates a defocus amount in the area m.

Note that the calculation of the level of similarity described above is calculated between adjacent areas, but it does not need to be for adjacent areas, and the level of similarity may be calculated based on values in accordance with a color or a distance between areas. In addition, propagation of a defocus amount with respect to the same area is not limited to once, and may be repeated a plurality of times. By repeating a plurality of times, it becomes easier to estimate a defocus amount for each area for which "error" was set in step S404.

In step S407, the defocus map score calculation unit 403 performs edge shaping. Edge shaping is processing for causing edges in the defocus map obtained in step S406 to match the edges of the input image. Specifically, the processing may be performed using an edge preserving filter as in Min, et al, IEEE Transactions on Image Processing, vol. 23, issue 12, pp. 5638-5653 2014, "Fast Global Smoothing Based on Weighted Least Squares" or Kopf et al, ACM Transactions on Graphics, "Joint Bilateral Upsampling", or the like. A method other than the method described above may be used if it is processing for causing edges in a defocus map to match edges in an input image. By performing this processing, relatedness of edges match between the input image and the output image, and consistency can be achieved. Note that a reason for performing edge shaping is because consideration is given to change such as to the position of an edge due to the conversion processing thus far (propagation processing and the like).

Effect of Third Embodiment

In the present embodiment, because a defocus map is calculated for each area, and an area having low reliability (accuracy) for the value of defocus is handled as an error, it is robust with respect to noise. In addition, because the fineness of area division is caused to change in accordance with the spatial distribution of scores for defocus, it is possible to increase the accuracy of the defocus amount of an area with high score, and correct the defocus amount of an area with low scores as much as possible using the defocus amount of an area with high scores.

In addition, in the present embodiment, the defocus amount calculated for each area is propagated based on the level of similarity between areas. Furthermore, by performing edge shaping, it is possible to cause the position of an edge of a defocus map to match the position of an edge of the input image. As a result, it is possible to suppress an artifact (an error or distortion) such as a pseudo contour after sharpening, which is caused by position of edges shifting.

Other Embodiments

As another embodiment of the present invention, description is given regarding an example of applying the distance information (the information corresponding to distance from the in-focus plane) according to the present invention to other processing in addition to three-dimensional appearance control.

Configuration may be taken to use the distance information according to the present invention for object recognition in an image. Japanese Patent Laid-Open No. 2014-17907 or the like has a detailed example of performing recognition using the depth of an object. By using the distance information (information corresponding to the distance from an in-focus plane) according to the present invention in object recognition, it is possible to obtain more accurate depth information. Accordingly, the accuracy of object recognition improves.

In addition, configuration may be taken to use the distance information according to the present invention in generation of a three-dimensional polygon model. Japanese Patent Laid-Open No. 2017-157208 or the like has a detailed example of using depth to generate a three-dimensional polygon model. By using the distance information (information corresponding to the distance from an in-focus plane) according to the present invention, it is possible to obtain more accurate depth information. Accordingly, the accuracy of the three-dimensional polygon model improves.

Configuration may be taken to use the distance information according to the present invention for object extraction. Japanese Patent Laid-Open No. 2015-162730 or the like has a detailed example of using depth to extract an object from an image. By using the distance information (information corresponding to the distance from an in-focus plane) according to the present invention in object recognition, it is possible to obtain more accurate depth information. Accordingly, the accuracy of object extraction improves.

In addition, configuration may be taken to use the distance information according to the present invention in effect processing of an image. Japanese Patent Laid-Open No. 2013-118468 or the like has a detailed example of using depth to apply an effect on an image. By using the distance information (information corresponding to the distance from an in-focus plane) according to the present invention in object recognition, it is possible to obtain more accurate depth information. Accordingly, this leads to a reduction of an artifact such as pseudo contour at a time of effect processing which occurs due to inaccurate depth information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-125281, filed Jun. 29, 2018, which is hereby incorporated by reference herein in its entirety.

What is claimed is:

1. An image processing apparatus comprising a processor and a memory storing a computer program which, when executed by the processor, causes the processor to function as a plurality of units comprising:
   (1) an obtainment unit configured to obtain (a) a captured image including a plurality of pixels, and (b) first distance information relating to a distance from an in-focus plane and corresponding to each of the plurality of pixels;
   (2) a deriving unit configured to derive evaluation values that indicate an accuracy of the first distance information for each of the plurality of pixels, based on values of the plurality of pixels included in the obtained captured image;
   (3) a division unit configured to divide the obtained captured image into a plurality of divided areas based on the evaluation values; and
   (4) a generation unit configured to generate second distance information for each of the plurality of divided areas,
   wherein the division unit divides the obtained captured image into the plurality of divided areas so that (a) a pixel density in an area of the captured image is determined, excluding any pixel the evaluation value of which does not exceed a threshold, and (b) in the dividing, a fineness of division of the area of the captured image is determined in accordance with the pixel density.

2. The image processing apparatus according to claim 1, wherein the first distance information is either defocus information, an image shift amount, or information indicating a distance from the in-focus plane to an object.

3. The image processing apparatus according to claim 1, wherein the deriving unit determines the pixel density, the determination comprising deriving a spatial distribution of the evaluation values with respect to the first distance information.

4. The image processing apparatus according to claim 1, wherein the generation unit generates the second distance information by performing weighting so that a weight for a value of the first distance information having a first evaluation value is greater than a weight for a value of the first distance information having a second evaluation value, the first evaluation value being greater than the second evaluation value.

5. The image processing apparatus according to claim 1, wherein the computer program, when executed by the processor, further causes the processor to function as a control unit configured to control a sharpness of an image outputted from an output apparatus, using (a) the second distance information generated by the generation unit and (b) an image processing condition, and wherein the image processing condition is defined based on an output characteristic of the output apparatus which varies in accordance with the second distance information.

6. The image processing apparatus according to claim 5, wherein the control unit controls the sharpness of the image outputted from the output apparatus by performing contrast processing or sharpness processing.

7. An image processing method comprising:

obtaining (a) a captured image including a plurality of pixels, and (b) first distance information relating to a distance from an in-focus plane and corresponding to each of the plurality of pixels;

deriving evaluation values that indicate an accuracy of the first distance information for each of the plurality of pixels, based on values of the plurality of pixels included in the obtained captured image;

dividing the obtained captured image into a plurality of divided areas based on the evaluation values; and generating second distance information for each of the plurality of divided areas, wherein the dividing divides the obtained captured image into the plurality of divided areas so that (a) a pixel density in an area of the captured image is determined, excluding any pixel the evaluation value of which does not exceed a threshold, and (b) in the dividing, a fineness of division of the area of the captured image is determined in accordance with the pixel density.

8. A non-transitory computer-readable storage medium storing a program which, when executed by processor of a computer, causes the processor to function as a plurality of units comprising:

(1) an obtainment unit configured to obtain (a) a captured image including a plurality of pixels, and (b) first distance information relating to a distance from an in-focus plane and corresponding to each of the plurality of pixels;

(2) a deriving unit configured to derive evaluation values that indicate an accuracy of the first distance information for each of the plurality of pixels, based on values of the plurality of pixels included in the obtained captured image;

(3) a division unit configured to divide the obtained captured image into a plurality of divided areas based on the evaluation values; and (4) a generation unit configured to generate second distance information for each of the plurality of divided areas, wherein the division unit divides the obtained captured image into the plurality of divided areas so that (a) a pixel density in an area of the captured image is determined, excluding any pixel the evaluation value of which does not exceed a threshold, and (b) in the dividing, a fineness of division of the area of the captured image is determined in accordance with the pixel density.

9. The image processing apparatus according to claim 1, wherein the generation unit generates the second distance information corresponding to an area of interest including at least one pixel, based on the first distance information of a surrounding area of the area of interest.

10. The image processing apparatus according to claim 1, wherein the fineness of division is greater when the pixel density is a first value than when the pixel density is a second value less than the first value.

11. The image processing apparatus according to claim 3, wherein the fineness of division is greater when the spatial distribution is a first value than when the spatial distribution is a second value less than the first value.

* * * * *